United States Patent [19]

Gideon

[11] 4,169,057

[45] Sep. 25, 1979

[54] FERTILIZER FILTER

[75] Inventor: Fray O. Gideon, Derby, Kans.

[73] Assignee: Boaz, Inc., Derby, Kans.

[21] Appl. No.: 885,168

[22] Filed: Mar. 10, 1978

[51] Int. Cl.² ................. B01D 35/22; B01D 35/16; B01D 35/02
[52] U.S. Cl. .................. 210/236; 210/447; 210/450; 210/451; 210/495; 210/498
[58] Field of Search ............. 210/232, 236, 445, 498, 210/435, 441, 447, 450, 451, 453, 454, 434

[56] References Cited

U.S. PATENT DOCUMENTS

| 779,201 | 1/1905 | Blackmarr et al. | 210/434 X |
|---|---|---|---|
| 1,424,197 | 8/1922 | Gebhard | 210/495 |
| 1,641,670 | 9/1927 | French | 210/498 X |
| 1,821,190 | 9/1931 | Ray et al. | 210/498 X |
| 1,857,606 | 5/1932 | Rendelman | 210/447 X |
| 2,488,806 | 11/1949 | Crowder | 210/447 X |
| 2,552,744 | 5/1951 | Smith | 210/498 X |
| 2,568,181 | 9/1951 | Zimmerman et al. | 210/435 |
| 2,576,470 | 11/1951 | May | 210/495 X |
| 3,347,385 | 10/1967 | Russell | 210/451 X |
| 3,353,678 | 11/1967 | Dragon | 210/236 |

Primary Examiner—Frank A. Spear, Jr.
Attorney, Agent, or Firm—Edward L. Brown, Jr.

[57] ABSTRACT

A rapid cleaning filter utilized in a liquid fertilizer system including an elongate tank having a screen filter element longitudinally disposed in the tank with an entry slot in the end of the tank for quick removal from the tank; sealing means around that portion of the filter element extending outwardly of the tank and a quick release latching arm for holding the element in sealing relation with the tank.

9 Claims, 4 Drawing Figures

FERTILIZER FILTER

BACKGROUND OF THE INVENTION

Depending on the particular crop and soil conditions, various liquid fertilizers are applied directly on the soil. These fertilizers are applied by self-propelled or tractor-pulled spray units in a low-pressure system and would include various types such as nitrogen, phosphate, potash, as well as other types of liquid agricultural fertilizers. The spray units which apply the fertilizer to the soil are supplied by larger truck-mounted nurse tanks which are in turn supplied by larger stationary storage tanks. In both of the latter two tank systems mentioned, the present invention is utilized since quite often the liquid fertilizer may sit in either of these tanks for extended periods of time. The filtering device of the present invention is not attempting to filter out very fine particles but rather only those large particles of rust or sludge which may clog the spray nozzles in the application apparatus. The amounts of filter material quite often become substantial and need to be quickly removed from the system. One of these materials is sludge which forms in the fertilizer itself by a process generally referred to as "salting out".

The prior art filtering devices used in fertilizer systems have never been adequate for a variety of different reasons and usually end up being removed from the system and discarded since they quickly clog-up and have no means of on-system flushing or cleaning. The flushing device of the present invention is an up-flow type filter wherein the heavier particles of rust, scale and sludge settle to the bottom of the filter and can be quickly removed from the system by a dump valve located in the sump of the filter. The filtering element, which is a stainless steel mesh screen, can be quickly removed from inside the filter tank by a quick-release latch mechanism; cleaned and returned to the filter tank in a matter of seconds.

While there are numerous prior art up-flow filters, such as for example U.S. Pat. No. 1,424,197, none of these filtering devices provide a means to rapidly remove, clean and replace the filter screen in a very short period of time. For example, the above mentioned patent requires the removal of the tank top and then the removal of the screen element, both of which require the removal and assembly of numerous bolts holding the screen in place and the top on the filter tank.

In the present invention the filter screen can be quickly removed by merely prying a single latch member over its dead-center position and sliding a single filter screen out of the tank. The filter screen provides its own sealing means for sealing the entry slot in the end wall of the tank in the form of a large o-ring stretched around the edge of the screen member.

Therefore the principal object of the present invention is to provide a fertilizer filter having a single rapid removal filtering element with a maximum area which can be quickly removed from the tank for cleaning.

Another object of the present invention is to provide a liquid fertilizer filter which is self-flushing with or without the removal of the filtering element.

Another object of the present invention is to provide a filter element with an optimum filter area for the size of the filter.

Another object of the present invention is to provide a very simplified cylindrical construction with a single element which is highly efficient in both the flush and the filter cycles.

These and other more particular objects and advantages of the present invention are specifically set forth in or will become apparent from the following detailed description of a preferred form of the invention when read in conjunction with the accompanying drawings, wherein.

Figure 1:
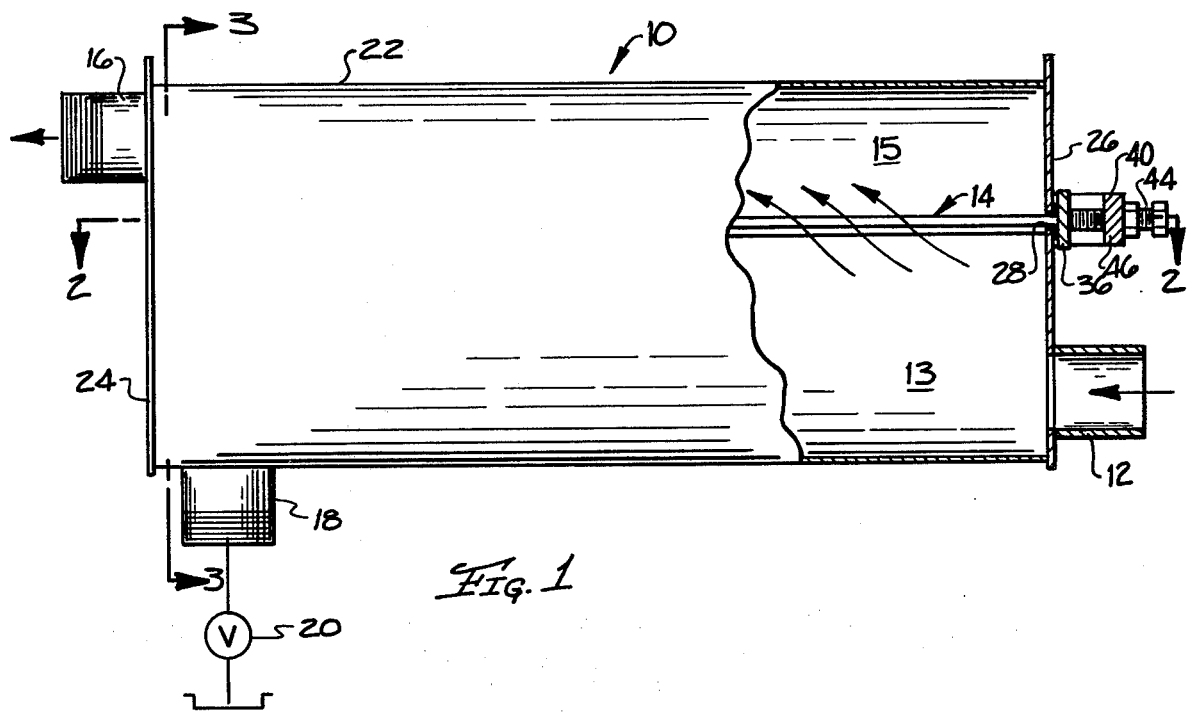
FIG. 1 is a side elevational view of the fertilizer filter with portions of one end broken away in section.
Figure 4:
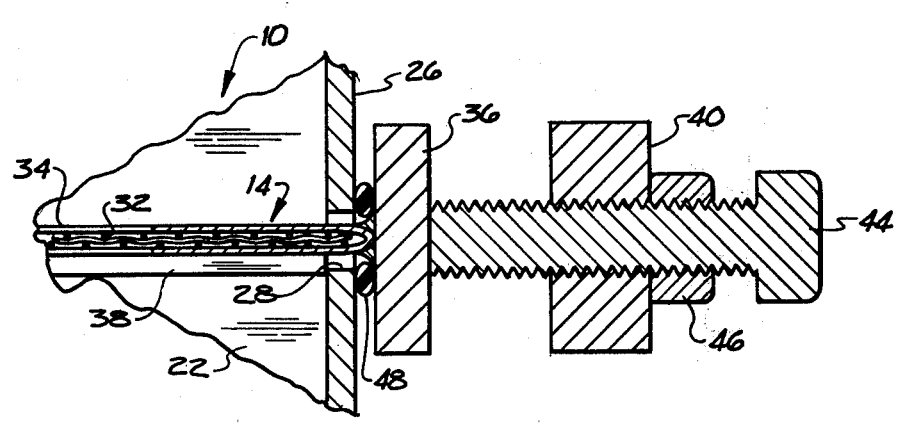
FIG. 4 is an enlarged fragmentary section.

Referring now to the drawings for a more detailed description of the invention, there is illustrated in FIG. 1 a cylindrical fertilizer filter generally referred to by reference numeral 10. Filter 10 is used not only in a stationary storage system for various liquid fertilizers, but also on a large truck-mounted supply tank system utilized for transporting the fertilizer to the farm. The liquid fertilizer enters the filter 10 through opening 12 into the lower chamber 13 of the filter. The liquid fertilizer passes through the filtering element 14 into the upper chamber 15 of the filter and then exits through opening 16 at the opposite end. Located at the sump of lower chamber 13 is another opening 18 which connects to a drain line controlled by valve 20, symbolically shown. The filter 10 is fabricated with a cylindrical side wall 22 closed at the ends by end walls 24 and 26. The various entry, exhaust and drain ports 12, 16 and 18, respectively, along with the end walls are all of a welded construction with all the materials being stainless steel. Located in end wall 26 is a traverse slot for receipt of the filter element which can best be seen in FIG. 4. Slot 28 extends traversely across the filter tank end wall and is substantially the same width as the removable filter element 14.

Figure 3:
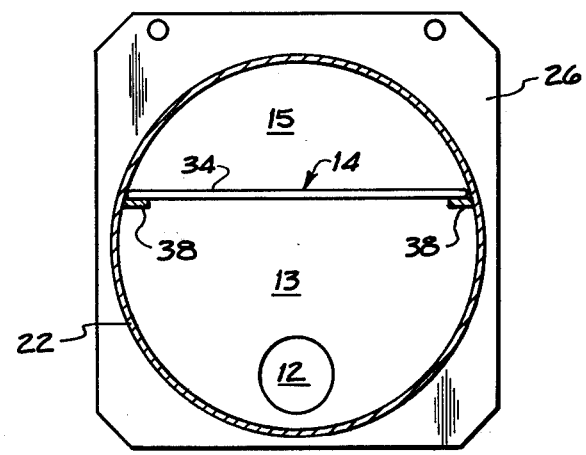
FIG. 3 is a lateral section taken along line 3—3 of FIG. 1.

Filter element 14 is made up of a wire mesh screen 32, surrounded by a metal frame 34. Welded to one end of frame member 34 is a flange element 36 having a width substantially wider than the slot 28, as can best be seen in FIG. 4. Positioned around the interior periphery of cylindrical side wall 22 is a ledge 38, which is best seen in FIG. 3, for supporting the filter element within the tank. Due to the converging side walls of the tank, the element 14 is prevented from any upward movement.

Figure 2:
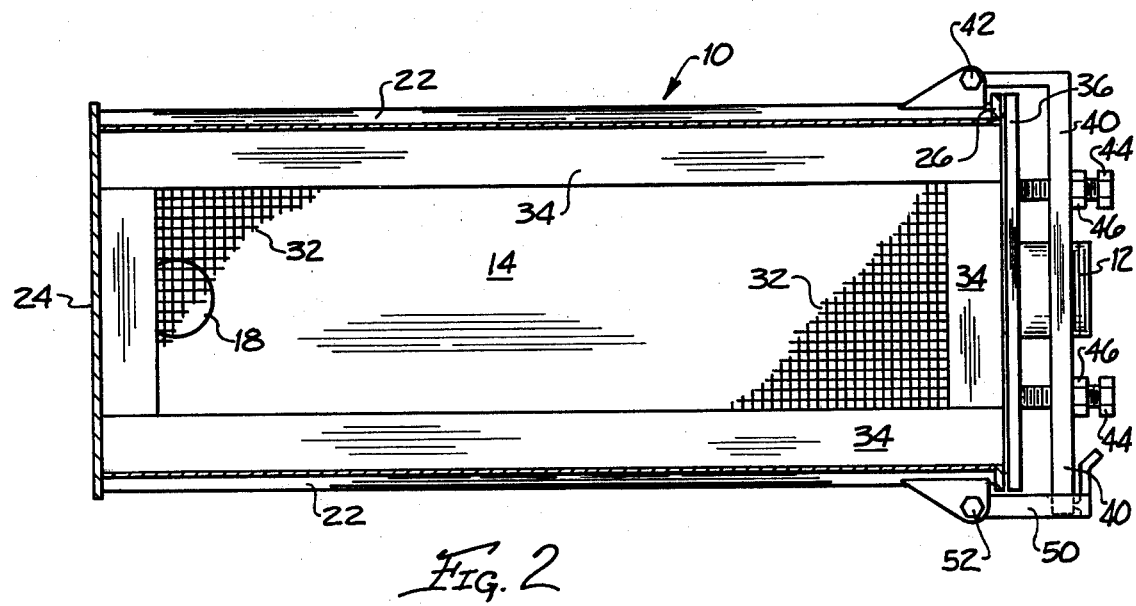
FIG. 2 is a longitudinal section taken along line 2—2 of FIG. 1.

The latching device for retaining the filter element in sealing engagement within the tank (FIG. 2) comprises a pivotally mounted arm 40 connected to the tank by bolt 42 in an offset manner which pivots in a common plane with traverse slot 28. Located on arm 40 are a pair of bolts 44 which bear against the backside of filter element flange 36. Bearing bolts 44, which are threadably received in arm 40, can be adjusted by releasing locking nut 46 to vary the force applied to the screen element 14. Stretched over the screen element 14 adjacent flange 36 is a large o-ring seal 48 which provides the means for sealing the filter element 14 in the filter tank 10 and the traverse slot 28. Arm 40 is held in place against element 14 by pivoted catch member 50 which encompasses the end of arm 40.

OPERATION

When the filter 10 is in use, liquid fertilizer flows through the filter as indicated by the arrows in FIG. 1. As the liquid passes through the filtering element 14, various particles of scale, rust and sludge are prevented from passage. Most of these materials being heavier than the fertilizer itself will collect upon the bottom of chamber 13 and the underside of screen 32. When it is desired to flush out the lower chamber 13 of the filter without removing the screen, valve 20 is merely opened and the various foreign particles and sludge at the bottom of lower chamber 13 are flushed from the chamber 13. Due to the curved shape of the bottom of chamber 13, the filtered material tends to collect at the center in close proximity to inlet opening 12. The flow path out the drain port 18 is also along the center of chamber 13, thereby effecting a very efficient flush cycle. When it is desired to clean the filtering element 14, the system pressure is relieved and catch member 50 is pried over its dead-center position releasing latching arm 40. The filter element 14 is then free to slide laterally out of the tank by merely grasping the flange 36 and pulling it from the tank. After the screen has been cleaned, it is re-inserted in slot 28 until its o-ring seal 48 comes in contact with end wall 26. Latching arm 40 is swung into place with bearing bolts 44 urging the flange 36 into sealing relation with end wall 26 and catch member 50 is swung into place engaging the end of arm 40.

Having thus described the invention with sufficient clarity to enable those familiar with the art to construct and use it, what is claimed as new and desired to be secured as Letters Patent, is:

1. A filter utilized in a liquid fertilizer system comprising:
    an elongate cylindrical tank with end walls enclosing same;
    one of the end walls having a traverse slot for receipt of a filter element;
    a removable filter element receivable in said slot having an enlarged flange integrally formed on the outer end thereof, said element positioned longitudinally in the container defining an upper filtered chamber and lower unfiltered chamber;
    fluid entry means in the lower chamber for receipt of the unfiltered fluid;
    fluid exhaust means in the upper chamber for exit of the filtered fluid;
    fluid drain means in the lower chamber which can be opened during a flush cycle allowing fluid from the entry means to pass out the drain means taking the filtered material which has settled to the bottom of the lower chamber;
    an o-ring seal surrounding the end of the filter element inwardly of said flange;
    adjustable latching means attached to the tank urging the flange portion of the filter element against the end wall thereby sealing the traverse slot and the filter element in the tank.

2. A filter as set forth in claim 1, wherein the latching means includes an arm hingedly mounted to one side of said tank extending across the end wall adjacent said slot; at least one adjustable bearing means carried on said arm for bearing against the flange of the filter element, and a catch member mounted on the opposite side of the tank for engaging and latching the free end of said arm.

3. A filter as set forth in claim 1, wherein the filter element is a frame surrounded mesh screen, said flange being substantially wider than the thickness of said traverse slot wherein the o-ring seal is sandwiched between said flange and portions of the end wall surrounding the traverse slot.

4. A filter as set forth in claim 1, wherein the latching means includes an arm hingedly mounted to one side of said tank extending across the end wall adjacent said slot; a pair of adjustable bearing means carried on said arm for bearing against the flange of the filter element, and a catch member mounted on the opposite side of the tank for engaging and latching the free end of said arm.

5. A filter as set forth in claim 1, wherein the latching means includes an arm hingedly mounted to one side of said tank extending across the end wall adjacent said slot urging said flange toward the end wall and a catch member mounted on the opposite side of the tank for engaging the free end of said arm.

6. A filter as set forth in claim 1, wherein the latching means includes an arm hingedly mounted to one side of said tank extending across the end wall adjacent said slot urging said flange toward the end wall and a catch member mounted on the opposite side of the tank for engaging the free end of said arm; the catch member having an over dead-center position.

7. A filter as set forth in claim 1, including ledge means positioned longitudinally along the inside of the cylindrical tank adjacent the traverse slot for support and positioning of the filter element, the traverse slot being positioned above the center of the tank so that the converging cylindrical tank in conjunction with the ledge means restrains the filter element from any upward movement.

8. A filter as set forth in claim 1, wherein the fluid entry means is located in one end wall approximate the bottom of the lower chamber.

9. A filter as set forth in claim 1, wherein the fluid entry means is located in one end wall approximate the bottom of the lower chamber and the drain means is located in the cylindrical tank at the opposite end from the entry port in the lowest spot of the cylindrical tank.

* * * * *